US008033500B1

(12) United States Patent
Charafeddine et al.

(10) Patent No.: US 8,033,500 B1
(45) Date of Patent: Oct. 11, 2011

(54) ACTUATOR LOAD PATH MONITORING SYSTEM

(75) Inventors: Abbas M. Charafeddine, Irvine, CA (US); Vincent Delacotte, Artiguelouve (FR)

(73) Assignee: Rockwell Collins, Inc., Cedar Rapids, IA (US)

( * ) Notice: Subject to any disclaimer, the term of this patent is extended or adjusted under 35 U.S.C. 154(b) by 730 days.

(21) Appl. No.: 12/150,365

(22) Filed: Apr. 28, 2008

(51) Int. Cl.
*B64C 13/38* (2006.01)

(52) U.S. Cl. .................. 244/75.1; 244/99.2

(58) Field of Classification Search ............. 244/75.1, 244/99.4, 99.3, 194
See application file for complete search history.

(56) References Cited

U.S. PATENT DOCUMENTS

| | | | |
|---|---|---|---|
| 3,695,096 A | 10/1972 | Kutsay | |
| 4,159,444 A * | 6/1979 | Bartlett et al. | 244/194 |
| 4,594,714 A * | 6/1986 | Fischer et al. | 244/194 |
| RE32,746 E | 9/1988 | Nelson | |
| 4,782,706 A | 11/1988 | Kister | |
| 5,114,096 A | 5/1992 | Wernicke | |
| 5,719,566 A * | 2/1998 | Readman et al. | 244/194 |
| 6,011,482 A | 1/2000 | Banks | |
| 6,140,942 A | 10/2000 | Bragg | |
| 6,239,713 B1 | 5/2001 | Harvey | |
| 6,389,915 B1 | 5/2002 | Wngett | |
| 6,622,972 B2 * | 9/2003 | Urnes et al. | 244/194 |
| 6,636,009 B2 * | 10/2003 | Walter | 318/564 |
| 6,672,540 B1 | 1/2004 | Shaheen | |
| 7,299,702 B2 | 11/2007 | Gibert | |
| 2006/0170535 A1 | 8/2006 | Watters | |

* cited by examiner

*Primary Examiner* — Galen Barefoot
(74) *Attorney, Agent, or Firm* — Daniel M. Barbieri

(57) ABSTRACT

An actuator load path monitoring system for an aircraft having an aircraft structure, a control surface, and, an actuator connected between the aircraft structure and the control surface to support and position the control surface as desired relative to the aircraft structure. The actuator is of a type including a) an upper actuator assembly securely connected to the aircraft structure, including a motor assembly and gear assembly; b) a ball screw assembly operatively connected to the gear assembly; c) a tie-rod assembly positioned within the ball screw assembly; and, d) a lower actuator assembly securely connected to the control surface, wherein actuation of the ball screw provides selected positioning of the control surface. The actuator load path monitoring system includes an upper load sensing assembly positioned in an upper load path between the upper actuator assembly and the aircraft structure. The upper load sensing assembly provides upper indications of the applied forces in the upper load path when the upper load path is disconnected. A lower load sensing assembly is positioned in a lower load path between the lower actuator assembly and the control surface. The lower load sensing assembly provides upper indications of the applied forces in the lower load path when the lower load path is disconnected. A computer system receives the upper and lower indications of applied forces and analyzes the upper and lower indications, thereby monitoring the structural integrity and safety of the upper and lower load paths by annunciating the detection of a failed portion thereof.

22 Claims, 8 Drawing Sheets

ACTUATOR LOAD PATH MONITORING SYSTEM

BACKGROUND OF THE INVENTION

1. Field of the Invention

The present invention relates generally to aircraft actuation systems, and more particularly to an actuation system that provides load path integrity monitoring.

2. Description of the Related Art

Modern aircraft have horizontal stabilizers located at the rear tail section of the fuselage or the forward section that are pivotally supported relative to the airplane fuselage to "trim" the aircraft during flight by selective adjustment by the operator or auto-pilot from an internal control unit. The stabilizer actuator is a variable length structural link connecting the horizontal stabilizer control surface to the fuselage structure and used to control the pitch (attitude) of the aircraft during take off, cruise and landing phases under different aerodynamic loading conditions. The stabilizer actuator is also used to recover the aircraft during severe aircraft stall situations. In this regard the stabilizer is traditionally pivotally connected to the rear section or tail section of the fuselage.

One common trimmable horizontal stabilizer actuator consists of a primary ball nut assembly connected with an actuating drive gimbal which is pivotally connected to one end of the horizontal stabilizer structure. The ball nut assembly includes a ball nut housing and a rotatable ball screw extending axially and usually vertically through the ball nut housing and a drive gimbal housing. The ball nut housing is connected to the drive gimbal housing by a trunnion segment. The ball screw, in turn, has its upper end remote from the actuating drive gimbal and is fixed from translation or axial movement by a connection to a second, support gimbal which is pivotally secured to the vertical stabilizer section or the tail section. As the ball screw is rotated, the drive gimbal will be moved in translation relative to it. Thus as the ball screw is rotated in one direction, the leading edge of the horizontal stabilizer is pivoted upward, whereas by rotating the ball screw in the other direction, the leading edge of the horizontal stabilizer is pivoted downward. Rotation of the ball screw is routinely done by a motor (electric or hydraulic, depending on system architecture) and associated gearing which is connected to the second, fixed support gimbal and which is actuated by the operator or pilot by the internal control unit. The connection of the stabilizer actuator to the stabilizer is located within the vertical stabilizer or fuselage tail section and not directly in the air stream.

The horizontal stabilizer movement, as controlled by the operator or auto-pilot, is transmitted by the ball screw through the actuating drive gimbal by way of the primary ball nut assembly which defines a primary load path. The movement has a load with tensile and compressive components as well as a torque component due to the ball screw thread lead. Failures of the primary load path such as caused by the shearing off of the connecting trunnion segment, ball screw disconnect or by the loss of nut ball members from the ball nut assembly can result in the complete loss of control of the horizontal stabilizer. However, stabilizer actuators have frequently been provided with a secondary load path for alternate control of the stabilizer and structural integrity, as well as to meet the required level of safety (failure of single load path actuator has a catastrophic outcome on the aircraft). In such structures, the primary load path is normally controllably actuated by the operator and is thus under load while the secondary load path is normally unactuated and thus unloaded. In the event of a primary load path failure, the secondary load path is automatically mobilized whereby the stabilizer actuator can continue to be controllably actuated by the operator or pilot by the internal control unit to control the position of the stabilizer. The transition of control to the secondary load path can occur quite rapidly whereby failure of the primary load path is not necessarily detected by the operator or pilot.

However, in the event of a subsequent failure of the secondary load path through continued, periodic use, control of the stabilizer wilt be completely lost which could result in erratic, oscillatory movement of the stabilizer whereby the ability of the pilot or operator to control the aircraft could be substantially inhibited. This problem is addressed by the present invention.

This problem was addressed in, for example, U.S. Pat. No. 6,672,540, entitled "Actuator For Aircraft Stabilizers With a Failure Responsive Lock Control Mechanism," issued to MA. Shaheen at al, and assigned to the present assignee, that discloses a horizontal stabilizer actuator for a winged aircraft which is selectively pivotally controlled by a pilot or operator at a remote location in the aircraft and which has a primary load path responsive to the selective control by the pilot or operator for setting the pivoted position of the stabilizer and which has a secondary load path which is responsive to a failure in the primary load path to be automatically actuated to a condition locking the stabilizer in a fixed position. The solution offered by the '540 patent offers detection of the actuator secondary load path engagement by means of a lock that will trigger and jam the ball screw in the event of a primary load path failure and secondary lock engagement. The jammed and immobilized actuator will stall the drive motor which is detected and annunciated by the system controller, thus annunciating the fault in the actuator. This solution is feasible when dealing with jamming devices needed to generate lock torque less than 3000 in-lb, which is feasible for actuators used on regional jets and small corporate jets. This solution becomes limited when dealing with large body aircraft. With large body aircraft the torque needed to stall the drive motor by means of locking and jamming the ball screw is extremely high (more than 10,000 in-lb) and is infeasible and unachievable without hugely impacting the envelope (volume) and weight of the actuator (especially the ball screw gimbal area where the lock is mounted).

The trend in aviation regulations shows that it is ever more desirable to have intelligent systems be aware in real time of the state of certain active elements, such as control surfaces. U.S. Pat. No. 7,299,702, entitled "Apparatus For Monitoring An Aircraft Flap and Application of a Dynamometric Rod," issued to F. Gibert, discloses and claims using a dynamometric pin for replacing a flap hinge pivot. The pin differs from dynamometric pins or shafts known in the previous prior art firstly because its sensing elements are enclosed inside the body of the pin, which is itself closed by packing, so they are not subjected to bad weather, and secondly because they possess the external characteristics of the pivots presently in use for mounting flap arms, and so they require no modification to the flaps, to the arms, or to the wing. However, the '702 device is deficient because it assumes that the surface is directly mounted to the aircraft structure and does not address the need to monitor the integrity of the load paths of actuators that actuate the control surfaces and that are typically mounted between the aircraft structure and the respective control surfaces. This solution maybe applicable to very light aircraft where the control surface is directly connected to the aircraft structure and it is manually controlled by cables, pulleys and control rod without actuators.

The dynamometric pin disclosed in the '702 patent is substantially that disclosed in U.S. Pat. No. 3,695,096, entitled "Strain Detecting Load Cell," issued to A. U. Kutsay. The '096 patent discloses and claims a strain detecting load cell which is adapted to replace or be readily interchangeable with coupling member such as a pin or bolt. The working dimensions of the cell and the part replaced are the same, except that the cell has short zones of slightly decreased diameter so that the shear strains are concentrated in these zones. An axial bore in the cell contains electrical strain gauges attached to its circumferential wall within the concentrating zones and having leads for connection to exterior measuring instrumentation such as Wheatstone bridge equipment. The arrangement and orientation of the gauges in the concentrating zones permit evaluation of the applied load both as to magnitude and direction.

SUMMARY OF THE INVENTION

In a broad aspect, the present invention is an actuator load path monitoring system for an aircraft having an aircraft structure, a control surface, and, an actuator connected between the aircraft structure and the control surface to support and position the control surface as desired relative to the aircraft structure. The actuator is of a type including a) an upper actuator assembly securely connected to the aircraft structure, including a motor assembly and gear assembly; b) a ball screw assembly operatively connected to the gear assembly; c) a tie-rod assembly (also called a safety-rod or safety-bar assembly) positioned within the ball screw assembly; and, d) a lower actuator assembly securely connected to the control surface, wherein actuation of the ball screw provides selected positioning of the control surface.

The actuator load path monitoring system includes an upper load sensing assembly positioned in an upper load path between the upper actuator assembly and the aircraft structure. The upper load sensing assembly provides upper indications of the applied forces in the upper load path when the upper load path is disconnected. A lower load sensing assembly is positioned in a lower load path between the lower actuator assembly and the control surface. The lower load sensing assembly provides upper indications of the applied forces in the lower load path when the lower load path is disconnected. A computer system receives the upper and lower indications of applied forces and analyzes the upper and lower indications, thereby monitoring the structural integrity and safety of the upper and lower load paths by annunciating the detection of a failed portion thereof.

In another broad aspect the present invention is embodied as an actuator system for an aircraft of a type having a primary aircraft structure, a secondary aircraft structure and a control surface positionable relative to said primary and secondary aircraft structures. The load path between the primary and secondary aircraft structure and the control surface defines a dual load path. The actuator system includes an upper actuator assembly; a ball screw assembly; a tie-rod assembly; a lower actuator assembly 22; and, a computer system 24.

The upper actuator assembly includes an upper actuator assembly housing. A gear assembly is supported by the upper actuator assembly housing. A motor assembly is operatively associated with the gear assembly. An upper primary gimbal assembly is mounted to the upper actuator assembly housing, the upper primary gimbal assembly being securely connected to a primary aircraft structure. An upper load sensing assembly is securely attached to a secondary aircraft structure.

The ball screw assembly is operatively connected to the gear assembly, the ball screw assembly includes: a ball screw; a ball nut assembly translatable along the ball screw; and, a secondary inverted thread nut in an unloaded standby mode operatively positioned about the ball nut assembly.

The tie-rod assembly is positioned within the ball screw assembly. The tie-rod assembly has an upper end securely attached to the upper load sensing assembly, wherein the upper load sensing assembly defines an upper portion of a secondary load path of a dual load path between the secondary aircraft structure and a control surface. The dual load path includes a primary load path acting and reacting to the applied aerodynamic load to the control surface and the secondary load path in a stand-by, unloaded mode, the upper load sensing assembly providing upper indications of the applied forces in the upper portion of the secondary load path when an upper portion of the primary load path is disconnected.

The lower actuator assembly, includes: i) a lower primary gimbal assembly operatively connected to the ball screw assembly, defining a lower portion the primary load path; ii) a lower secondary gimbal assembly positioned about the lower primary gimbal assembly and securely connected to the control surface; iii) a yoke assembly operatively connected to the secondary inverted thread nut and to the lower secondary gimbal assembly; and, iv) a lower load sensing assembly securely attached to the yoke assembly for providing the operative connection between the yoke assembly (operatively connected to the secondary nut) and the lower secondary gimbal assembly (operatively connected to the control surface).

A lower portion of the primary load path is defined by the load from the ball screw to the ball nut assembly to the lower primary gimbal assembly to the control surface. A lower portion of the secondary load path is defined by the load from the ball screw to the secondary inverted thread nut to the yoke assembly to the lower load sensing assembly to the lower secondary gimbal assembly to the control surface. The lower load sensing assembly provides lower indications of the applied forces in the lower portion of the secondary load path when the lower portion of the primary load path is disconnected.

The computer system receives the upper and lower indications of applied forces and analyzes the upper and lower indications, thereby monitoring the structural integrity and safety of the dual load path by annunciating the detection of a failed portion thereof.

The upper load sensing assembly preferably comprises a pair of upper load sensing elements. Similarly, the lower load sensing assembly preferably comprises a pair of upper load sensing elements. Each of these load sensing elements is preferably a dynamometric type of load sensing pin having at least one strain gauge bridge positioned within the housing of the pin.

The present invention provides an adjustment/rigging-free, extremely light and compact solution which directly measures secondary load path loading in real time. It has an extremely fast response time for detecting the loaded secondary load path. It involves communicating with the controller (i.e. computer system) that is analyzing measurements and taking decisions based on direct measurements rather than deduction of events. Furthermore, it is redundant, highly integrated, hermetically sealed and easily field replaceable as well as designed to aerospace environmental requirements per the RICA DO160 standard.

In the present invention, the upper load sensing elements by themselves and the lower load sensing elements by themselves are designed and architected to meet the load path structural integrity up to limit load when engaged. Using ground support equipment the upper load sensing elements and the lower load sensing elements can be field inspected.

DETAILED DESCRIPTION OF THE INVENTION

Figure 1:
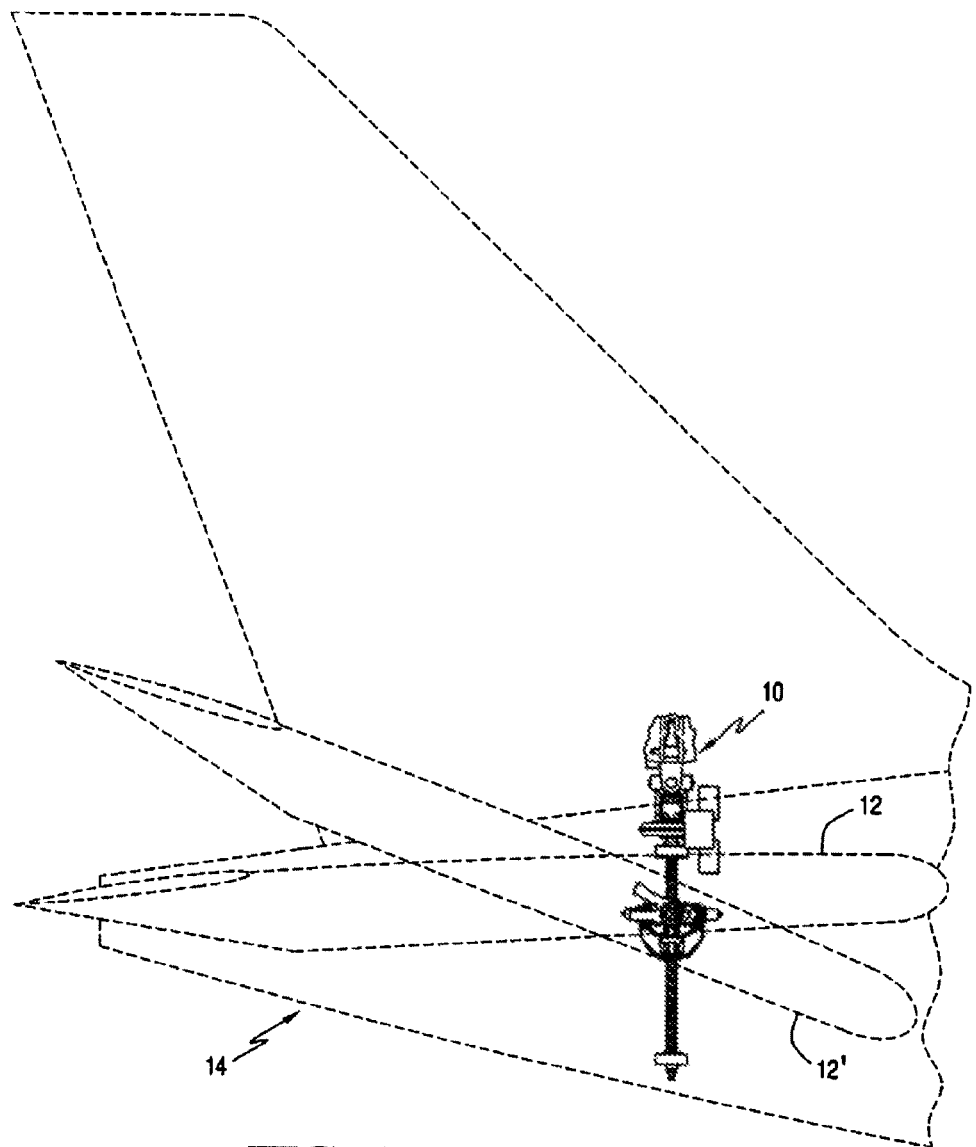
FIG. 1 is a schematic illustration of the actuator system of the present invention, shown affixed to the horizontal stabilizer of a large body aircraft.

Referring now to the drawings and the characters of reference marked thereon, FIG. 1 illustrates the actuator system, designated generally as 10, in accordance with the principles of the present invention, embodied for use with a horizontal stabilizer 12 of an aircraft 14. The actuator 10 functions along its stroke to facilitate pivoting of the horizontal stabilizer 12 as shown by numeral designation 12' (aircraft pitched nose up).

Figure 2:
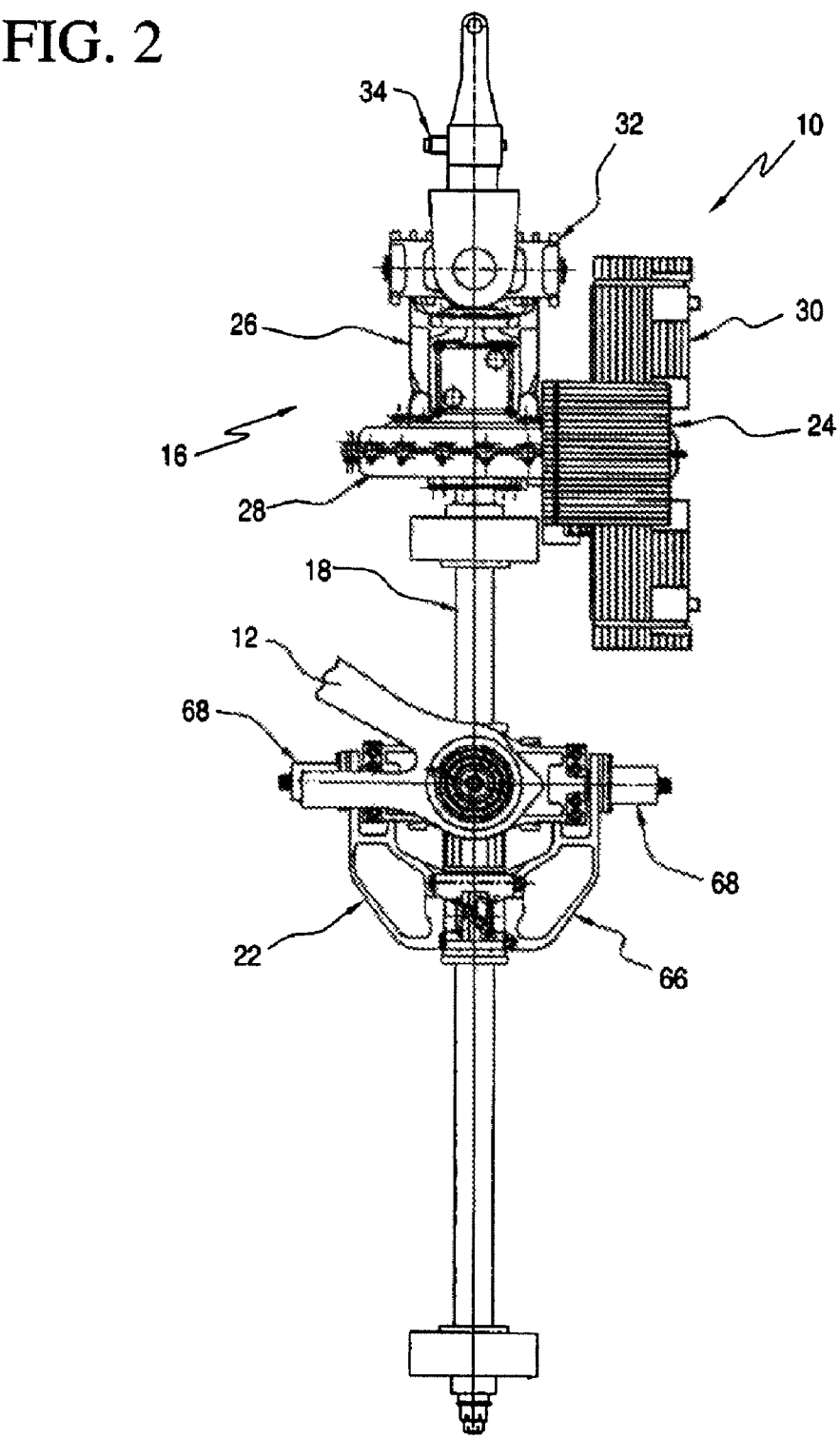
FIG. 2 is an enlarged side view of the actuator system of FIG. 1.
Figure 3:
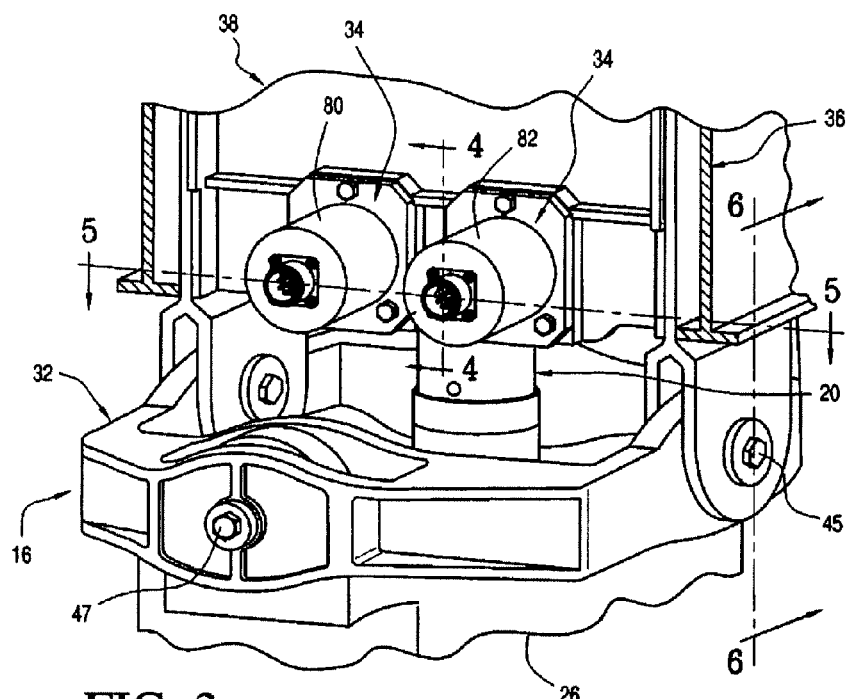
FIG. 3 is a perspective view of a portion of the upper actuator assembly of the actuator system with multiple upper load sensing assembly shown.
Figure 4:
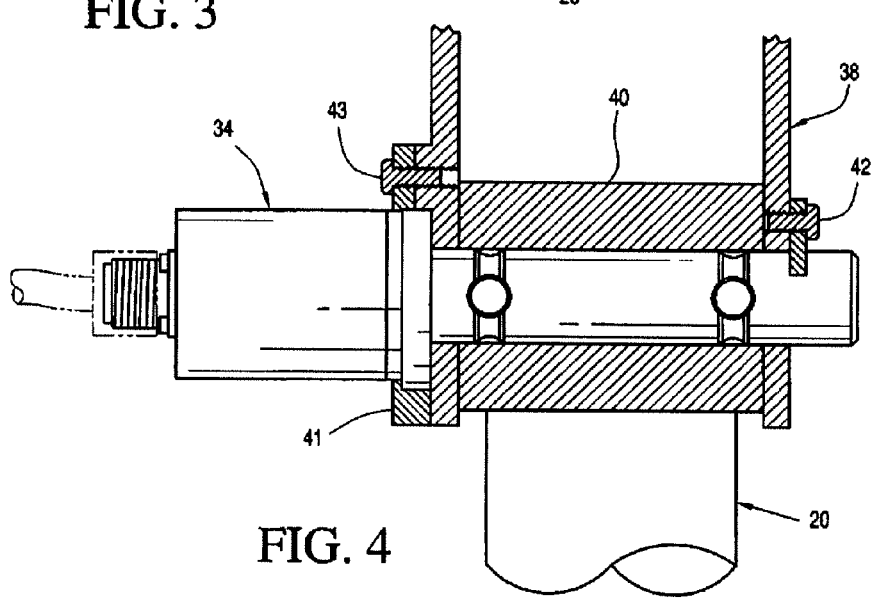
FIG. 4 is a view taken along line 4-4 of FIG. 3.
Figure 5:
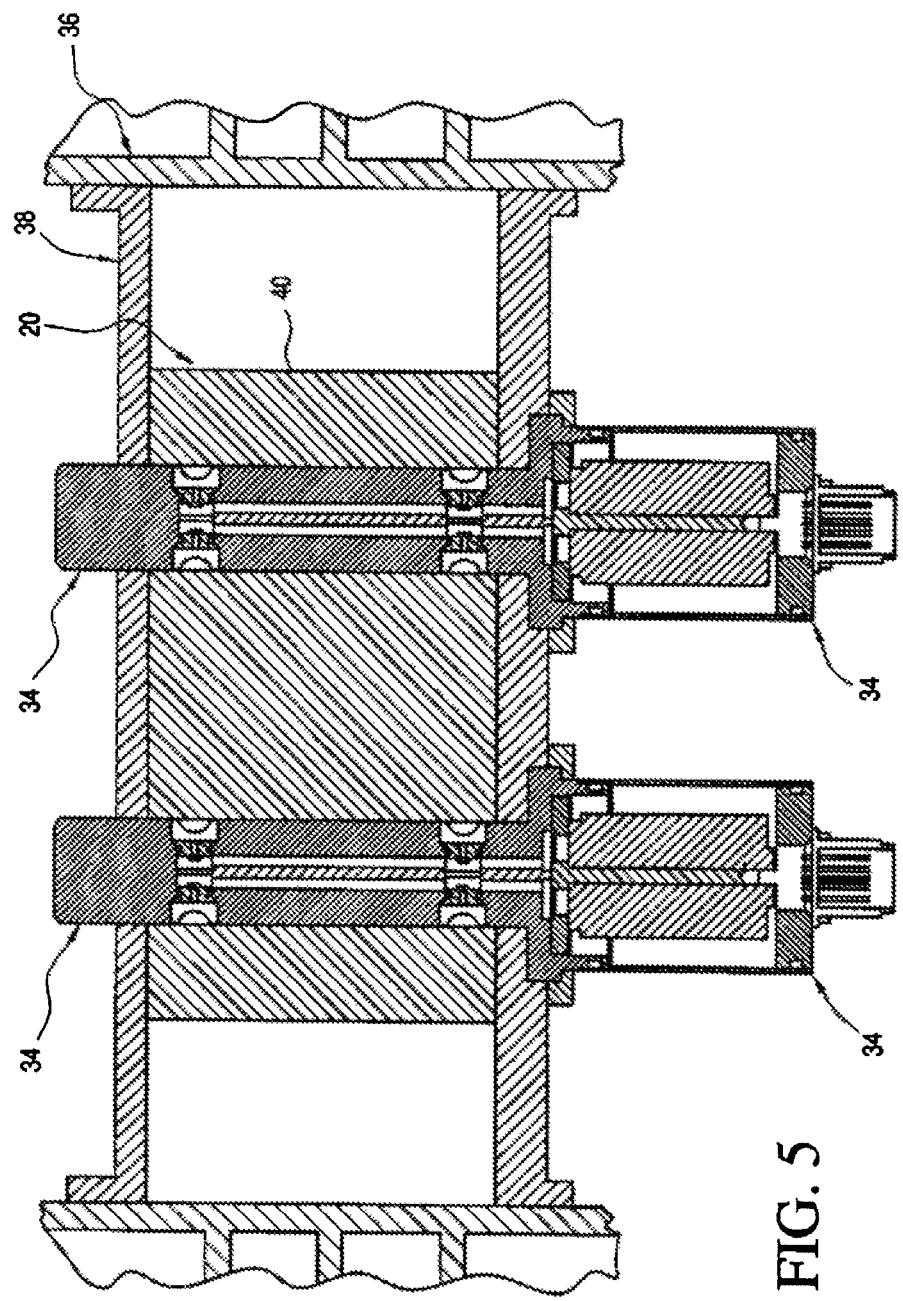
FIG. 5 is a view taken along line 5-5 of FIG. 3.
Figure 6:
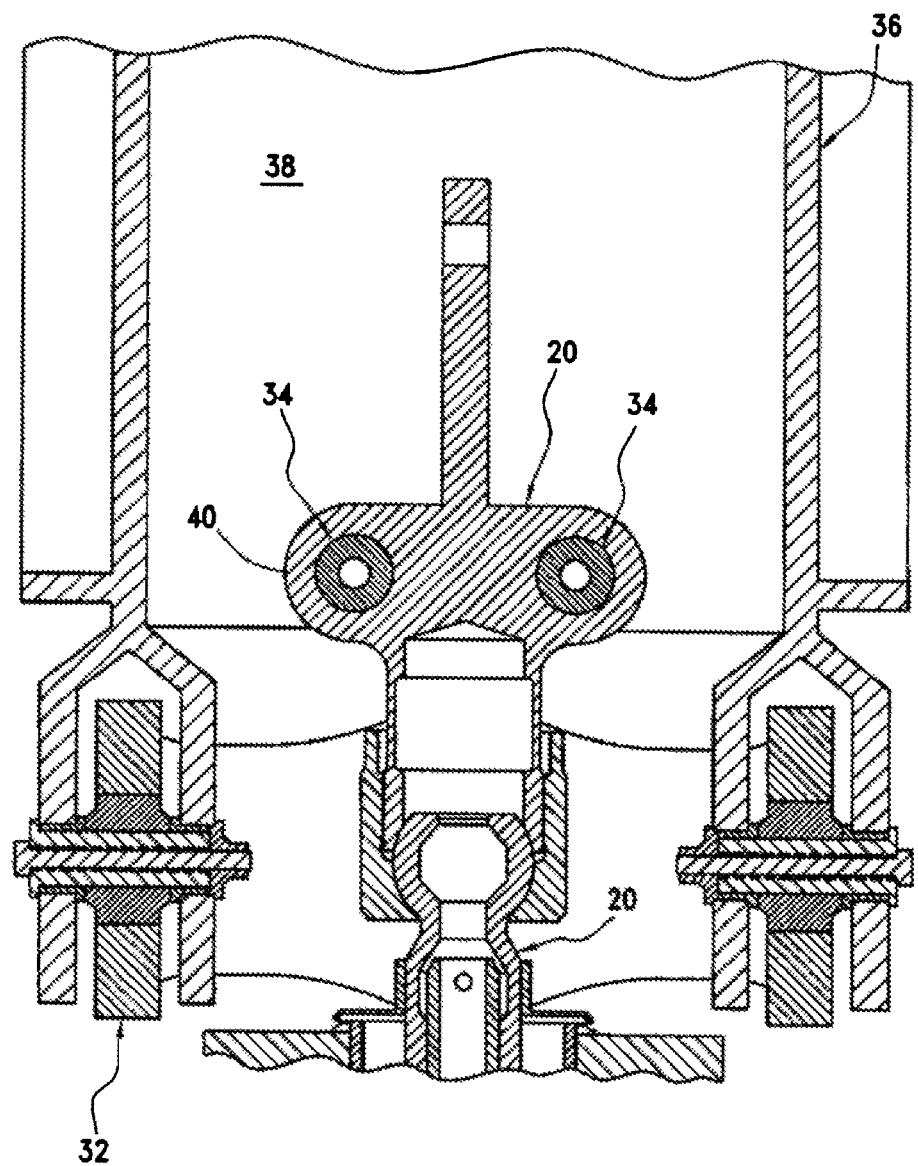
FIG. 6 is a view taken along line 6-6 of FIG. 3.

Referring now to FIG. 2, the actuator system includes an upper actuator assembly 16; a ball screw assembly 18; a tie-rod assembly 20 (shown in subsequent figures); a lower actuator assembly 22; and, a computer system 24.

With references to FIGS. 2-6, the upper actuator assembly 16 includes an upper actuator assembly housing 26; a gear assembly 28 supported by the upper actuator assembly housing 26; a motor assembly 30 operatively associated with the gear assembly 28; an upper primary gimbal assembly 32 mounted to the upper actuator assembly housing 26; and, an upper load sensing assembly 34. The upper primary gimbal assembly 32 is securely connected to a primary aircraft structure 36. The upper load sensing assembly 34 is securely attached to a secondary aircraft structure 38.

The upper end 40 of the tie-rod assembly 20 forms a fitting that is securely attached to the upper secondary aircraft structure 38 which forms a clevis or fork fitting using upper load sensing assembly 34. The upper load sensing assembly 34 in this case is defined by two identical load sensing elements (or pins) 80 and 82 (described in detail below with respect to FIG. 10), each of which, is radially clocked and axially positioned and retained against the secondary aircraft structure 38. The radial clocking is achieved using a groove provided in the load sensing assembly 34 and plate lock mount 42 as well as using a flat in the load sensing pin flange. The axial positioning and retaining is achieved using a flange retainer 41 and three hexagonal bolt mounts 43.

The upper load sensing assembly 34 defines the upper portion of the secondary load path of the dual load path between the secondary aircraft structure 38 and the horizontal stabilizer 12. The dual load path includes a primary load path acting and reacting the applied aerodynamic load to the horizontal stabilizer 12 and the secondary load path in a stand-by, unloaded mode. The upper load sensing assembly 34 provides upper indications of the applied forces in the upper portion of the secondary load path when an upper portion of the primary load path is disconnected (such as failure in upper primary gimbal 32, failure in connection between upper primary gimbal 32 and housing 26 represented by bolt 47, failure of housing 26 or failure in the connection between upper primary gimbal 32 and primary aircraft structure 36 represented by bolt 45, etc.).

Figure 7:
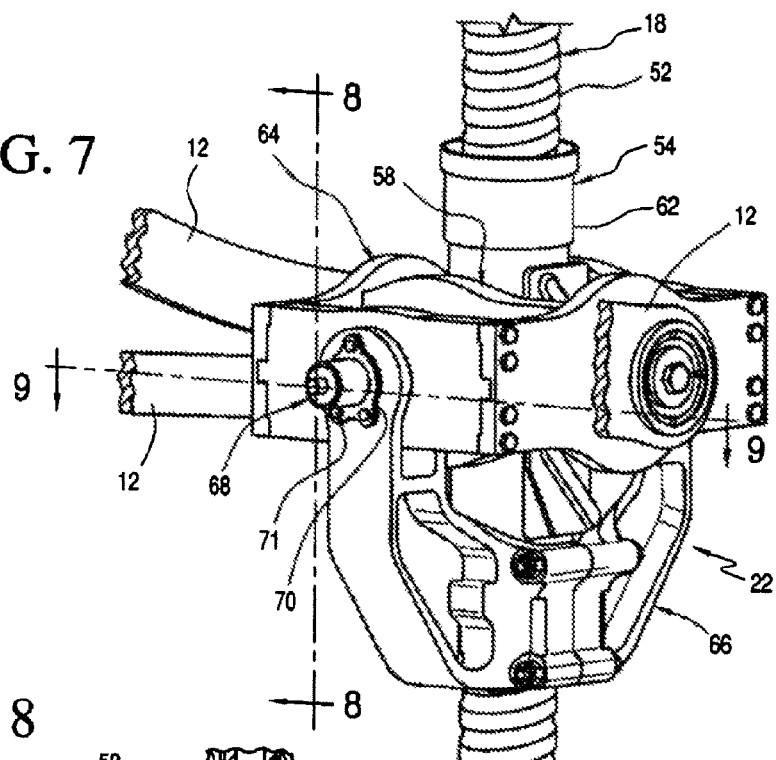
FIG. 7 is a perspective view of a portion of the lower actuator assembly of the actuator system.
Figure 8:
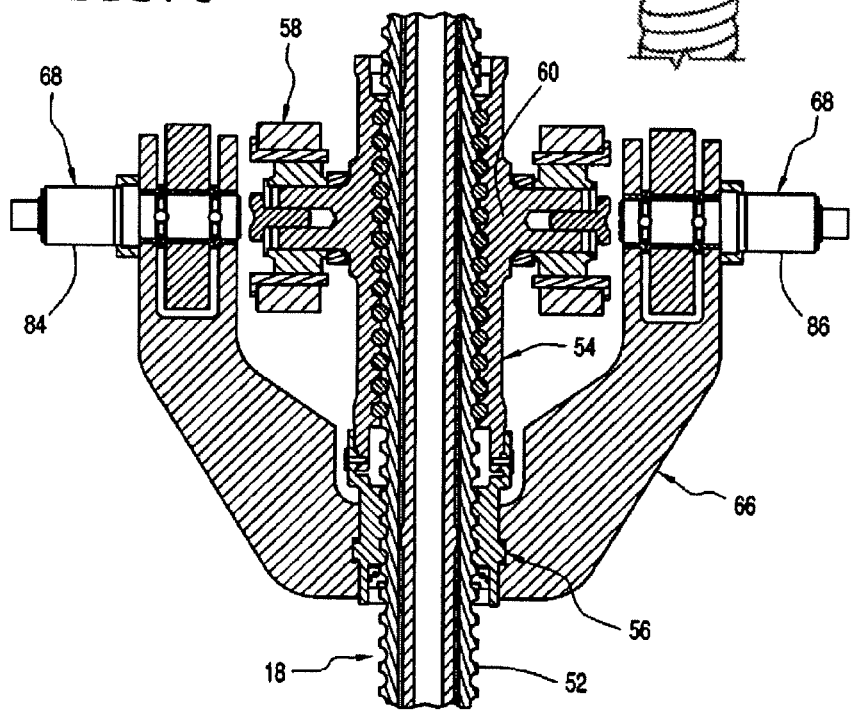
FIG. 8 is a view taken along line 8-8 of FIG. 7.
Figure 9:
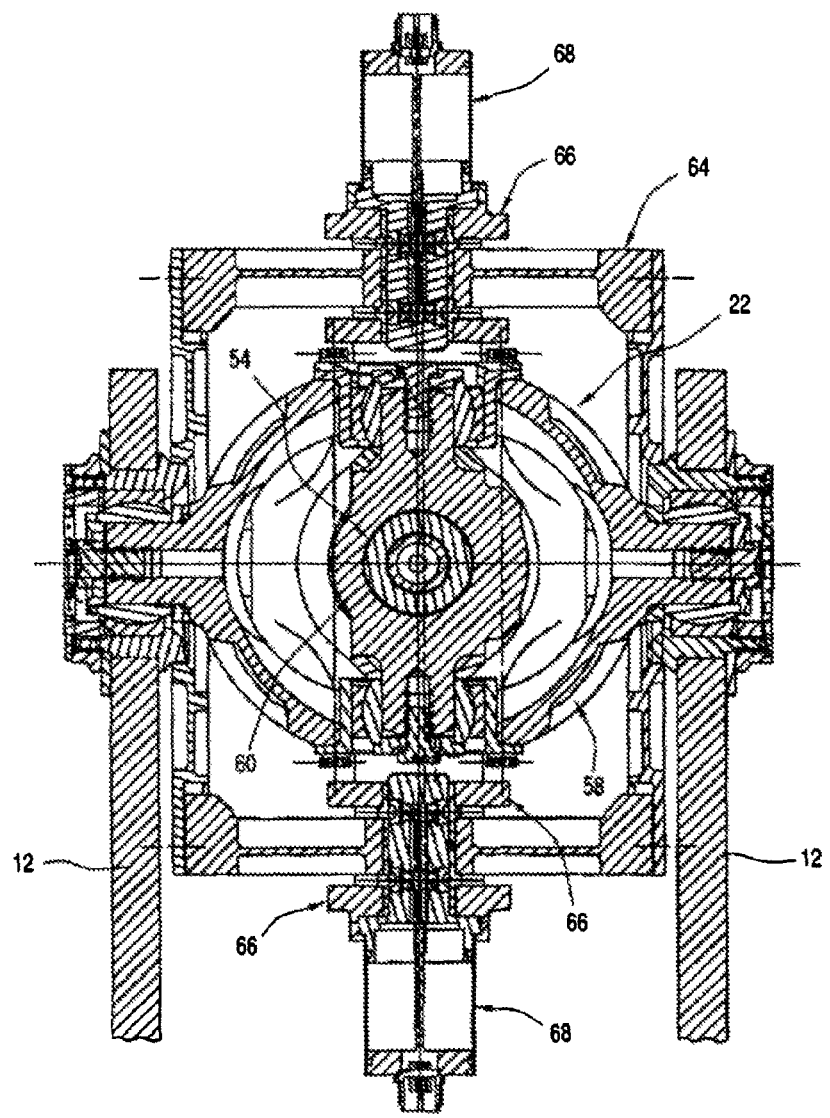
FIG. 9 is a view taken along line 9-9 of FIG. 8.

The ball screw assembly 18 is positioned about the tie-rod assembly 20. Referring now to FIGS. 7-9, the ball screw assembly 18 includes a ball screw 52, a ball nut assembly 54 translatable along the ball screw 52, and a secondary inverted thread nut 56 in an unloaded standby mode operatively positioned about the ball nut assembly 54. Instead of using a ball screw assembly another type of power screw (i.e. jack screw) can be used such as an Acme screw assembly.

The lower actuator assembly 22 includes a lower primary gimbal assembly 58 operatively connected to the ball screw assembly 18 through a trunnion 60 part of the ball nut assembly 54. This defines a lower portion the primary load path (i.e. attachment to the horizontal stabilizer 12). A lower secondary (square) gimbal assembly 64 is positioned about the lower primary gimbal assembly 58 and securely connected to the horizontal stabilizer 12. A yoke assembly 66 is operatively connected to the secondary inverted thread nut 56 and to the lower secondary gimbal assembly.

A lower load sensing assembly 68 is securely attached to the yoke assembly 66 for providing the operative connection between the yoke assembly 66 and the lower secondary gimbal assembly 64. Thus, a lower portion of the primary load path is defined by the load path from the ball screw 52 to the ball nut assembly 54 to the lower primary gimbal assembly 58 to the control surface 12. A lower portion of the secondary load path is defined by the load from the bail screw 52 to the secondary inverted thread nut 56 to the yoke assembly 66 to the tower load sensing assembly 68 to the lower secondary gimbal assembly 64 to the control surface 12. The lower load sensing assembly 68 provides lower indications of the applied forces in the lower portion of the secondary load path when the lower portion of the primary load path is disconnected.

The secondary inverted thread nut 56 maintains an attachment of the lower actuator assembly 22 to the control surface 12 upon failure.

The lower load sensing assembly 68 in this case is defined by two identical load sensing elements 84 and 86 (discussed below in detail), each which is radially clocked and axially positioned and retained against yoke assembly 66. The radial clocking is achieved using a flat in the load sensing pin round flange that is matched against a corresponding flat in the yoke assembly 66. The axial positioning and retaining is achieved using a flange retainer 70 and three hexagonal bolt mounts 71.

The computer system 24 receives the upper and lower indications of applied forces and analyzes these upper and lower indications, thereby monitoring the structural integrity and safety of the dual load path by annunciating the detection of a failed portion thereof.

The upper load sensing assembly 34 preferably comprises a pair of upper load sensing elements 80, 82. Similarly, the lower load sensing assembly 68 preferably comprises a pair of upper load sensing elements 84, 86. Each of these load sensing elements is preferably a dynamometric type of load sensing pin having at least one strain gauge bridge positioned within the housing of the pin. Such a load sensing element (i.e. pin) is disclosed in U.S. Pat. No. 3,695,096, discussed above, entitled "Strain Detecting Load Cell," issued to A. U.

Kutsay. U.S. Pat. No. 3,695,092 is incorporated by reference herein, in its entirety. Because of the safety and criticality of the upper load sensing assembly, the pins that make the upper load sensing assembly are designed to withstand the structural limit and ultimate loads. The same applies to the lower load sensing assembly.

U.S. Pat. No. 7,299,702, entitled "Apparatus For Monitoring An Aircraft Flap and Application of a Dynamometric Rod," issued to F. Gibert, also discussed above, also discloses such a load sensing element. U.S. Pat. No. 7,299,702, is incorporated by reference herein, in its entirety.

Each of the load sensing elements, is an environmentally and hermetically sealed element capable of operating in an aircraft environment of −65° C. to +85° C. Each has external characteristics commensurate for mating engagement with respective mating surfaces of the upper actuator assembly and lower actuator assembly. Thus, the load sensing elements are very compact and fit within the original envelope of an actuator and can be retrofitted on already designed aircraft in service as well as newly developed programs.

Figure 10:
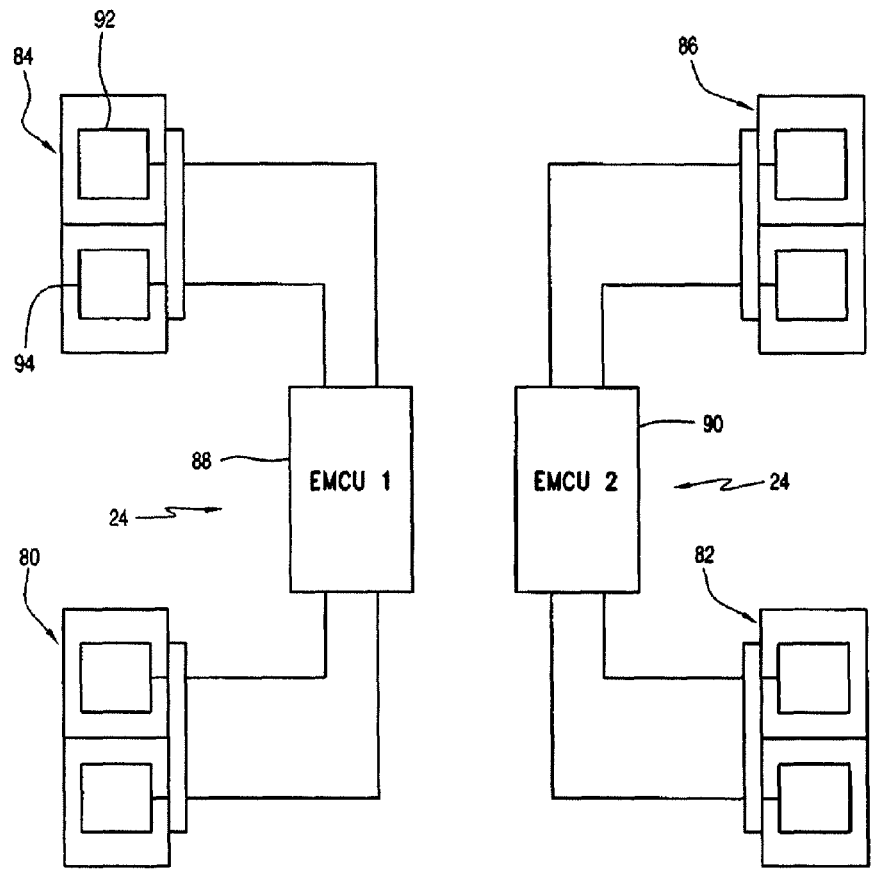
FIG. 10 is schematic diagram showing the relationship of the load sensing elements with a computer system (i.e. EMCU—electronic module control unit) of the actuator system.

Referring now to FIG. 10, a simplified schematic diagram showing the relationship of the load sensing elements with a computer system 24 illustrated. The computer system 24 preferably includes a first computer channel (i.e. EMCU 1 (electronic module control unit 1)) 88 operatively connected to a first upper sensing element 80 of the pair of upper load sensing elements and to a first lower sensing element 84 of the pair of lower sensing elements. A second computer channel (i.e. EMCU 2) 90 is operatively connected to a second upper sensing element 82 of the pair of upper load sensing elements and to a second lower sensing element 86 of the pair of lower sensing elements. The first computer channel and the second computer channel are preferably electrically and mechanically segregated. Each EMCU is designed to control the actuation system including the task of analyzing, processing and decision making of load path integrity monitoring and detection.

Additionally, it is preferred that each of the load sensing elements is dual channel, as indicated in sensing element 84, for example, by numeral designations 92 and 94. The dual channels of each of the load sensing elements are preferably electrically and mechanically segregated.

The powering of the strain gauge bridges and processing of the respective output signals are performed by their respective EMCU's. The load sensing element output signals are preferably continuously monitored in order to detect erroneous conditions, for example, a sensing element interface cut wire, short circuit at the connector level or between wires, or out of range signals. The EMCU's work in an active/standby configuration, i.e. only the active EMCU is driving the actuator. Sensing elements are always powered and processed by their respective EMCU, regardless of the EMCU Standby/Active mode. The dual channel load sensing element internal architecture, combined with the dual channel EMCU redundancy, provides the opportunity to Implement a 3 out of 4 voting logic at the aircraft level, thus nulling the effect of a load sensing element single failure.

In case of the failure in the primary load path, the secondary load path will become loaded and the load sensing elements will transmit, to their respective EMCU's, a signal reflecting this increased load. Each EMCU implements a comparison algorithm of the measured load versus a minimal load threshold set with a sufficient margin to minimize the potential of a false alarm. A secondary load path engagement detection condition is set. If this condition is confirmed by the other channel, and by the flight control computer, the active EMCU receives the order to stop the actuator and to engage the brake of the motor, thus immobilizing the system until safe continuation of flight and landing and replacement of the faulty actuator after landing.

Although the present invention has been described in detail above with the upper load sensing assembly and lower load sensing assembly being mounted on the secondary load path it can be alternatively implemented to serve a similar purpose by loading it on the primary load path. A further alternative would be to implement it on a single load path and simply monitor the single load path such as in a trailing edge flap actuation system or leading edge slat actuation system where multiple single load path actuators are mounted to a single control surface.

In the event of implementation on the primary load path, the present invention enables continuous monitoring and recording of loads reacted by the actuator system throughout its life on the aircraft allowing visibility on the history of the actuator system for maintenance and overhaul interval optimization purposes.

Although the invention has been described with respect to utilization with a horizontal stabilizer it may be implemented with a variety of control surfaces such as an aileron, a wing trailing edge flap, a wing leading edge slat, an elevator, an Eleven (control surface performing roles of elevator and aileron), a Flaperon (a control surface performing roles of wing flap trailing edge and aileron), or wing (for variable wing sweep aircraft).

Other embodiments and configurations may be devised without departing from the spirit of the invention and the scope of the appended claims.

The invention claimed is:

1. An actuator system for an aircraft of a type having a primary aircraft structure, a secondary aircraft structure and a control surface positionable relative to said primary and secondary aircraft structures, the load path between the primary and secondary aircraft structure and the control surface defining a dual load path, said actuator system, comprising:
 a) an upper actuator assembly, comprising:
  i. an upper actuator assembly housing;
  ii. a gear assembly supported by said upper actuator assembly housing;
  iii. a motor assembly operatively associated with said gear assembly;
  iv. an upper primary gimbal assembly mounted to said upper actuator assembly housing, said upper primary gimbal assembly being securely connected to a primary aircraft structure; and,
  v. an upper load sensing assembly securely attached to a secondary aircraft structure;
 b) a ball screw assembly operatively connected to said gear assembly, said ball screw assembly, comprising:
  i. a ball screw;
  ii. a ball nut assembly translatable along said ball screw; and,
  iii. a secondary inverted thread nut in an unloaded standby mode operatively positioned about said ball nut assembly;
 c) a tie-rod assembly positioned within said ball screw assembly, said tie-rod assembly having an upper end securely attached to said upper load sensing assembly, wherein said upper load sensing assembly defines an upper portion of a secondary load path of a dual load path between the secondary aircraft structure and a control surface, said dual load path including a primary load path acting and reacting the applied aerodynamic load to the control surface and said secondary load path in a stand-by, unloaded mode, said upper load sensing assembly providing upper indications of the applied forces in said upper portion of said secondary load path when an upper portion of the primary load path is disconnected;
d) a lower actuator assembly, comprising:
  i. a lower primary gimbal assembly operatively connected to said ball screw assembly, defining a lower portion of the primary load path;
  ii. a lower secondary gimbal assembly positioned about said lower primary gimbal assembly and securely connected to the control surface;
  iii. a yoke assembly operatively connected to said secondary inverted thread nut and to said lower secondary gimbal assembly; and,
  iv. a lower load sensing assembly securely attached to said yoke assembly for providing said operative connection between said yoke assembly and said lower secondary gimbal assembly, wherein,
    1. a lower portion of said primary load path is defined by the load from said ball screw to said ball nut assembly to said lower primary gimbal assembly to said control surface;
    2. a lower portion of said secondary load path is defined by the load from said ball screw to said secondary inverted thread nut to said yoke assembly to said lower load sensing assembly to said lower secondary gimbal assembly to said control surface; and,
    3. said lower load sensing assembly provides lower indications of the applied forces in said lower portion of said secondary load path when the lower portion of said primary load path is disconnected; and,
e) a computer system for receiving said upper and lower indications of applied forces and analyzing said upper and lower indications, thereby monitoring the structural integrity and safety of said dual load path by annunciating the detection of a failed portion thereof.

2. The actuator system of claim 1, wherein:
a) said upper load sensing assembly, comprises a pair of upper load sensing elements;
b) said lower load sensing assembly, comprises a pair of lower load sensing elements; and,
c) said computer system comprises:
  i. a first computer channel operatively connected to a first upper sensing element of said pair of upper load sensing elements and to a first lower sensing element of said pair of lower sensing elements; and,
  ii. a second computer channel operatively connected to a second upper sensing element of said pair of upper load sensing elements and to a second lower sensing element of said pair of lower sensing elements, said first computer channel and said second computer channel being electrically and mechanically segregated.

3. The actuator system of claim 2, wherein,
a) each of said upper load sensing elements is dual channel; and,
b) each of said lower load sensing elements is dual channel, said dual channels being electrically and mechanically segregated.

4. The actuator system of claim 1, wherein said control surface comprises a horizontal stabilizer.

5. The actuator system of claim 1, wherein said control surface comprises an aileron.

6. The actuator system of claim 1, wherein said control surface comprises a wing trailing edge flap.

7. The actuator system of claim 1, wherein said control surface comprises a wing leading edge slat.

8. The actuator system of claim 1, wherein said control surface comprises an elevator.

9. The actuator system of claim 1, wherein said control surface comprises an Elevon.

10. The actuator system of claim 1, wherein said control surface comprises a Flaperon.

11. The actuator system of claim 1, wherein said control surface comprises a wing.

12. The actuator system of claim 1, wherein said computer system powers said upper and lower load sensing assemblies.

13. An actuator load path monitoring system for an aircraft having an aircraft structure, a control surface, and, an actuator connected between the aircraft structure and the control surface to support and position the control surface as desired relative to the aircraft structure, the actuator being of a type including:
a) an upper actuator assembly securely connected to the aircraft structure, including a motor assembly and gear assembly;
b) a ball screw assembly operatively connected to the gear assembly; and,
c) a lower actuator assembly securely connected to the control surface, wherein actuation of the ball screw provides selected positioning of said control surface,
wherein said actuator load path monitoring system, comprises:
a) an upper load sensing assembly positioned in an upper load path between said upper actuator assembly and said aircraft structure, said upper load sensing assembly providing upper indications of the applied forces in said upper load path when the upper load path is disconnected;
b) a lower load sensing assembly positioned in a lower load path between said lower actuator assembly and said control surface, said lower load sensing assembly providing upper indications of the applied forces in said lower load path when the lower load path is disconnected; and,
c) a computer system for receiving said upper and lower indications of applied forces and analyzing said upper and lower indications, thereby monitoring the structural integrity and safety of the upper and lower load paths by annunciating the detection of a failed portion thereof.

14. The actuator load path monitoring system of claim 13, wherein said upper load sensing assembly and said lower load sensing assembly each comprises a dynamometric load sensing pin having at least one strain gauge bridge positioned within the housing of the pin, each load sensing pin having external characteristics commensurate for mating engagement with mating surfaces of the upper actuator assembly and lower actuator assembly.

15. The actuator load path monitoring system of claim 13, wherein:
a) said upper load path in which said upper load sensing assembly is positioned comprises an upper portion of a secondary load path of a dual load path; and,
b) said lower load path in which said lower load sensing assembly is positioned comprises a lower portion of said secondary load path of said dual load path.

16. The actuator load path monitoring system of claim 13, wherein:
a) said upper load path in which said upper load sensing assembly is positioned comprises an upper portion of a primary load path of a dual load path; and, b) said lower load path in which said lower load sensing assembly is positioned comprises a lower portion of said primary load path of said dual load path.

17. The actuator load path monitoring system of claim 13, wherein:
   a) said upper load sensing assembly, comprises a pair of upper load sensing elements;
   b) said lower load sensing assembly, comprises a pair of lower load sensing elements; and,
   c) said computer system comprises:
      i. a first computer channel operatively connected to a first upper sensing element of said pair of upper load sensing elements and to a first lower sensing element of said pair of lower sensing elements; and,
      ii. a second computer channel operatively connected to a second upper sensing element of said pair of upper load sensing elements and to a second lower sensing element of said pair of lower sensing elements, said first computer channel and said second computer channel being electrically and mechanically segregated.

18. The actuator load path monitoring system of claim 13, wherein:
   a) each of said upper load sensing elements is dual channel; and,
   b) each of said lower load sensing elements is dual channel, said dual channels being electrically and mechanically segregated.

19. The actuator load path monitoring system of claim 13, wherein each of said load sensing elements, is an environmentally and hermetically sealed element capable of operating in an aircraft environment of −65° C. to +85° C.

20. The actuator load path monitoring system of claim 13, wherein said computer system powers said upper and lower load sensing assemblies.

21. A method for monitoring the load path of an actuator for an aircraft having an aircraft structure, a control surface, and, an actuator connected between the aircraft structure and the control surface to support and position the control surface as desired relative to the aircraft structure, the actuator being of a type including:
   a) an upper actuator assembly securely connected to the aircraft structure, including a motor assembly and gear assembly;
   b) a ball screw assembly operatively connected to the gear assembly; and,
   c) a lower actuator assembly securely connected to the control surface, wherein actuation of the ball screw provides selected positioning of said control surface,
   wherein the method of monitoring the load path of the actuator, comprises the steps of:
   a) positioning an upper load sensing assembly in an upper load path between said upper actuator assembly and said aircraft structure, said upper load sensing assembly providing upper indications of the applied forces in said upper load path when the upper load path is disconnected;
   b) positioning a lower load sensing assembly in a lower load path between said lower actuator assembly and said control surface, said lower load sensing assembly providing upper indications of the applied forces in said lower load path when the lower load path is disconnected; and,
   c) utilizing a computer system for powering, monitoring and for receiving said upper and lower indications of applied forces and analyzing said upper and lower indications, thereby monitoring the structural integrity and safety of the upper and lower load paths by annunciating the detection of a failed portion thereof.

22. An actuator system for an aircraft of a type having a primary aircraft structure, a secondary aircraft structure and a control surface positionable relative to said primary and secondary aircraft structures, the load path between the primary and secondary aircraft structure and the control surface defining a dual load path, said actuator system, comprising:
   a) an upper actuator assembly, comprising:
      i. an upper actuator assembly housing;
      ii. a gear assembly supported by said upper actuator assembly housing;
      iii. a motor assembly operatively associated with said gear assembly;
      iv. an upper primary gimbal assembly mounted to said upper actuator assembly housing, said upper primary gimbal assembly being securely connected to a primary aircraft structure; and,
      v. an upper load sensing assembly securely attached to a secondary aircraft structure,
   b) a power screw assembly operatively connected to said gear assembly, said ball screw assembly, comprising:
      i. a power screw;
      ii. a nut assembly translatable along said power screw; and,
      iii. a secondary inverted thread nut in an unloaded standby mode operatively positioned about said nut assembly;
   c) a tie-rod assembly positioned within said power screw assembly, said tie-rod assembly having an upper end securely attached to said upper load sensing assembly, wherein said upper load sensing assembly defines an upper portion of a secondary load path of a dual load path between the secondary aircraft structure and a control surface, said dual load path including a primary load path acting and reacting the applied aerodynamic load to the control surface and said secondary load path in a stand-by, unloaded mode, said upper load sensing assembly providing upper indications of the applied forces in said upper portion of said secondary load path when an upper portion of the primary load path is disconnected;
   d) a lower actuator assembly, comprising:
      i. a lower primary gimbal assembly operatively connected to said power screw assembly, defining a lower portion of the primary load path;
      ii. a lower secondary gimbal assembly positioned about said lower primary gimbal assembly and securely connected to the control surface;
      iii. a yoke assembly operatively connected to said secondary inverted thread nut and to said lower secondary gimbal assembly; and,
      iv. a lower load sensing assembly securely attached to said yoke assembly for providing said operative connection between said yoke assembly and said lower secondary gimbal assembly, wherein,
         1. a lower portion of said primary load path is defined by the load from said power screw to said nut assembly to said lower primary gimbal assembly to said control surface;
         2. a lower portion of said secondary load path is defined by the load from said power screw to said secondary inverted thread nut to said yoke assembly to said lower load sensing assembly to said lower secondary gimbal assembly to said control surface; and, 3. said lower load sensing assembly provides lower indications of the applied forces in said lower portion of said secondary load path when the lower portion of said primary load path is disconnected; and, e) a computer system for receiving said upper and lower indications of applied forces and analyzing said upper and lower indications, thereby monitoring the structural integrity and safety of said dual load path by annunciating the detection of a failed portion thereof.

* * * * *